(No Model.)

H. ROEBER.
SLED PROPELLER.

No. 508,980. Patented Nov. 21, 1893.

Attest:

F. L. Middleton

Inventor
Heinrich Roeber
by Ellis Spear
Atty.

UNITED STATES PATENT OFFICE.

HEINRICH ROEBER, OF DRUXBERGE, NEAR MAGDEBURG, GERMANY.

SLED-PROPELLER.

SPECIFICATION forming part of Letters Patent No. 508,980, dated November 21, 1893.
Application filed April 13, 1893. Serial No. 470,170. (No model.)

*To all whom it may concern:*

Be it known that I, HEINRICH ROEBER, brick-maker, of Druxberge, near Magdeburg, in the Kingdom of Prussia and German Empire, have invented a new and useful Improvement in Sledges, of which the following is a specification, reference being had therein to the accompanying drawings.

This invention relates to a sledge which is propelled by means of pedal-mechanism similar to that in use on velocipedes. A sledge so constructed is especially adapted for use by children but is also applicable for use by adults. It is not of excessive weight and possesses great stability.

The construction of the sledge is illustrated by the accompanying drawings reference to which is hereinafter made.

Figure 2:
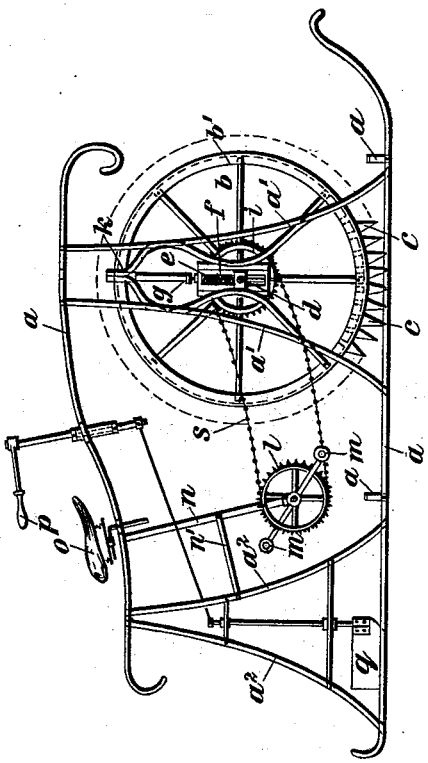
Figure 1:
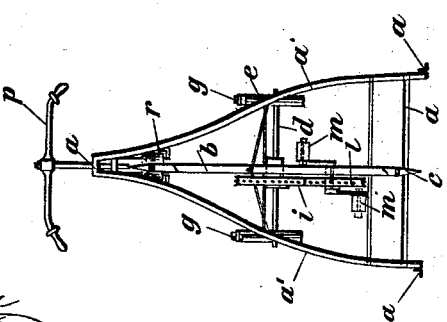

Figure 1 illustrates a front end elevation. Fig. 2 represents a side elevation.

The body of the sledge consists essentially of the frame $a$ furnished with front stays $a'$ $a'$ and back stays $a^2$ $a^2$. The frame and the stays may be constructed of wood, iron or other suitable material. The driving wheel $b$ is placed between the front stays and may be made extremely light as the pressure upon it is but very slight. Suitable teeth are arranged upon the rim of the wheel $b$ in such a way as to either form one solid piece with the rim $f$ of the wheel or to be detachable therefrom so as to allow defective teeth to be removed and replaced by new ones with ease. If the sledge is principally intended for use on snow surfaces the teeth at their extreme ends are preferably provided with sharp paddles somewhat inclined to the direction of the revolution of the wheel, this construction not being shown herein, whereas the arrangement of simple sharp teeth or points is the most suitable for ice surfaces. To enable the sledge being used for both purposes the driving wheel may be arranged in such a way that it can easily be exchanged. The length of the teeth must be such that while their rigidity is not affected yet they must be long enough to grip upon the snow or ice. Since the ground upon which the gliding rails of the sledge and the driving wheel move, are not always of the same hardness, the axis of the driving wheel is mounted so as to be capable of vertical motion and to be pressed down constantly by a spiral spring $f$. By this pressure the teeth of the wheel are compelled to constantly grip the ground. The pressure exerted by the spring upon the driving wheel can be altered or varied as desired by means of the regulating screws $g$. To afford a firm guide for the driving wheel which as described is only loosely mounted and to avoid any lateral movement the wheel rim moves between two guide rollers $r\,r$ fitted to the stays $a'\,a'$ in any suitable manner. These rollers may if desired have an elastic mounting so as to give with the lateral pressure of the driving wheel. The rider who is seated upon the adjustable saddle $o$ arranged upon the upper part of the frame, turns the chain wheel $l$ by the pedals $m$. This wheel $l$ is carried by a rod $n$ stayed at $n'$, to the stay $a^2$ and its motion is transmitted by a chain to the chain wheel $i$ upon the axis of the driving wheel. A rudder $q$ controlled by the handle bar $p$ either constantly glides lightly upon the ground or by means of a special arrangement can be pressed on the ground whenever it is intended to alter the direction of the sledge. If it should be found necessary, the position of the seat and driving wheel may be reversed.

Having now particularly described and ascertained the nature of my invention, I declare that what I claim, and desire to secure by Letters Patent of the United States, is—

1. A sled comprising the frame, the driving wheel journaled in yielding bearings therein having connections for driving the same, and the rollers mounted in the frame and bearing against the rim on each side for preventing lateral motion thereof, substantially as described.

2. In combination, the runners, a series of pairs of converging stays mounted thereon, a longitudinal bar mounted upon the upper ends of said stays, a driving wheel journaled between the forward stays, a sprocket wheel located in rear of the driving wheel having a chain connection with the driving wheel, a saddle located above the sprocket wheel, a vertical shaft journaled in cross bars connecting the rear stays, a rudder located on the lower end of said shaft, a handle bar and connections therefrom to the vertical shaft, substantially as described.

In witness whereof I have hereunto set my hand in presence of two witnesses.

HEINRICH ROEBER.

Witnesses:
PAUL FISCHER,
PAUL P. CULN.